(12) United States Patent
Suzuki et al.

(10) Patent No.: US 12,147,449 B2
(45) Date of Patent: Nov. 19, 2024

(54) DATABASE MANAGEMENT SYSTEM

(71) Applicant: Dendritik Design, Inc., Tokyo (JP)

(72) Inventors: Takayuki Suzuki, Kawasaki (JP); Kazutami Arimoto, Kobe (JP); Tadashi Takamura, Tokyo (JP)

(73) Assignee: DENDRITIK DESIGN, INC., Tokyo (JP)

( * ) Notice: Subject to any disclaimer, the term of this patent is extended or adjusted under 35 U.S.C. 154(b) by 100 days.

(21) Appl. No.: 17/919,793

(22) PCT Filed: Apr. 16, 2021

(86) PCT No.: PCT/JP2021/015732
§ 371 (c)(1),
(2) Date: Oct. 19, 2022

(87) PCT Pub. No.: WO2021/215362
PCT Pub. Date: Oct. 28, 2021

(65) Prior Publication Data
US 2023/0205788 A1  Jun. 29, 2023

(30) Foreign Application Priority Data

Apr. 21, 2020  (JP) .................................. 2020-075264
Oct. 22, 2020  (JP) .................................. 2020-177165

(51) Int. Cl.
*G06F 16/00* (2019.01)
*G06F 16/22* (2019.01)
(Continued)

(52) U.S. Cl.
CPC ........ *G06F 16/282* (2019.01); *G06F 16/2246* (2019.01); *G06F 16/24561* (2019.01); *G06F 16/275* (2019.01)

(58) Field of Classification Search
None
See application file for complete search history.

(56) References Cited

U.S. PATENT DOCUMENTS

| | | | |
|---|---|---|---|
| 2014/0081939 A1* | 3/2014 | Adams ................ | G06F 16/2455 707/705 |
| 2020/0004757 A1* | 1/2020 | Hirose ................ | G06F 16/2455 |
| 2021/0124749 A1* | 4/2021 | Suzuki ................ | G06F 16/2282 |

FOREIGN PATENT DOCUMENTS

| | | |
|---|---|---|
| JP | H04-274534 A | 9/1992 |
| JP | H09-244939 A | 9/1997 |

(Continued)

OTHER PUBLICATIONS

International Search Report issued Jul. 13, 2021 in PCT/JP2021/015732 (with English translation), 5 pages.

*Primary Examiner* — Anhtai V Tran
(74) *Attorney, Agent, or Firm* — Element IP, PLC

(57) ABSTRACT

A database management system includes: a hierarchical database including one primary database, an intermediate database, and end databases; and a searching unit which searches, from registered data in the hierarchical database, for matching data which matches a search criterion. At least the end databases store plural pieces of the registered data. The primary database or the intermediate database includes a virtual data table in which search paths are grouped by common information relating to the plural pieces of the registered data. The search paths lead to the registered data stored in: a next-lower database; or the intermediate database or the end database, each being indirectly connected to the primary database or the intermediate database through the next-lower database. The searching unit adopts, as a starting point of a search, the intermediate database or the end database which involves the common information contained in the search criterion.

20 Claims, 13 Drawing Sheets

(51) Int. Cl.
  *G06F 16/2455* (2019.01)
  *G06F 16/27* (2019.01)
  *G06F 16/28* (2019.01)

(56) References Cited

FOREIGN PATENT DOCUMENTS

| | | |
|---|---|---|
| JP | 2007184850 A | 7/2007 |
| JP | 6602500 B1 | 11/2019 |
| JP | 2020004339 A | 1/2020 |
| WO | WO-2019031006 A1 | 2/2019 |
| WO | WO-2020217748 A1 | 10/2020 |

\* cited by examiner

DATABASE MANAGEMENT SYSTEM

TECHNICAL FIELD

The present invention relates to a database management system.

BACKGROUND ART

For example, in a database which retains data (sensor data) obtained from sensors, information therefor is being collected from a broad scope in connection to IoT (Internet of Things), for which needs are growing in recent years, with the information amount as well becoming enormous. As a method of managing, parsing, and analyzing a database with such an enormous amount of information, an approach of dispersing a database has long been known, with research into scaling-up and acceleration thereof being vigorously conducted. By aligning computers having about the same calculation ability and/or using cloud computing, such a dispersed database has achieved scaling-up and acceleration.

However, parsing and/or analyzing an enormous amount of the sensor data with a single large-scale database alone requires expensive transmission fees for collecting the sensor data, and an extremely large-scale, large-capacity database infrastructure for retaining the data collected.

Incidentally, in most cases, sensing information at normal times accounts for a majority of the enormous amount of the sensor data, with sensing information differing from that at normal times and sensing information at abnormal times accounting for merely a portion thereof. In such a situation, when viewed from a perspective of information management and utilization of an overall system, there is less necessity to provide all of the sensor data to a data center such as a cloud, it being rather more useful to conduct information management and utilization at edge portions (terminals).

As a method of conducting information management and utilization at such edge portions, a hierarchical database has been proposed (see Japanese Unexamined Patent Application, Publication No. 2007-184850). The hierarchical database disclosed in this publication is used to manage frequency usage situations for a wireless communication system that implements cognitive radio. "Cognitive radio" as referred to means a communication system which scans frequency bands which may be usable to detect a usage situation, and uses a frequency band which is not being used.

The cognitive communication system disclosed in this publication includes a wireless communication system composed of: a detection device that detects the usage situation of the ambient radio frequency, and a first database device that retains the frequency usage situation detected by the detection device; and a second database device that integrates one or more first database devices. In this cognitive communication system, collection of data which is insufficient in the first database device, and the like is left to the second database device, being an upper-level database, thereby reducing a transmission amount and making a large-capacity database unnecessary.

CITATION LIST

Patent Literature

Japanese Unexamined Patent Application, Publication No. 2007-184850

SUMMARY OF INVENTION

Technical Problem

However, even in the above-described conventional hierarchical database, to limit individual databases located at ends to no greater than a certain scale, there are cases where the number of databases becomes enormous. In such cases, when the collection of data which is insufficient in the first database devices is left to the second database device, being the upper-level database, it becomes necessary for the second database device to search data the many first database devices, being connected below the second database device. Furthermore, in a case in which information is still insufficient, depending on a hierarchical structure, it may be necessary to leave data collection to a further upper-level database device. Thus, in the case of the above-described conventional hierarchical database, a processing amount may become expansive in data searches.

The present invention was made in view of the aforementioned circumstances, and an object of the present invention is to provide a database management system that enables limiting an expansion of a processing amount in searches of registered data, and efficiently searching the registered data.

Solution to Problem

According to one aspect of the presently claimed invention, a database management system includes: a hierarchical database having one primary database, and a plurality of end databases connected to the primary database directly or indirectly through at least one intermediate database; and a searching means which searches, from registered data being registered in the hierarchical database, for matching data which matches search criterion, wherein at least the end databases store a plurality of pieces of the registered data, the primary database or the intermediate database has a virtual data table in which search paths are grouped by common information relating to the plurality of pieces of the registered data, the search paths leading to the registered data stored in: a next-lower database which is the lower level-side intermediate database or the lower level-side end database, each being directly connected to the primary database or the intermediate database; or the intermediate database or the end database, each being indirectly connected to the primary database or the intermediate database through the next-lower database, and the searching means adopts, as a starting point of a search, the intermediate database or the end database which involves the common information contained in the search criterion.

Advantageous Effects of Invention

The database management system of the present invention enables limiting an expansion of a processing amount in searches of data, and efficiently searching the data.

DESCRIPTION OF EMBODIMENTS

Description of Embodiments of Present Invention

Figure 1:
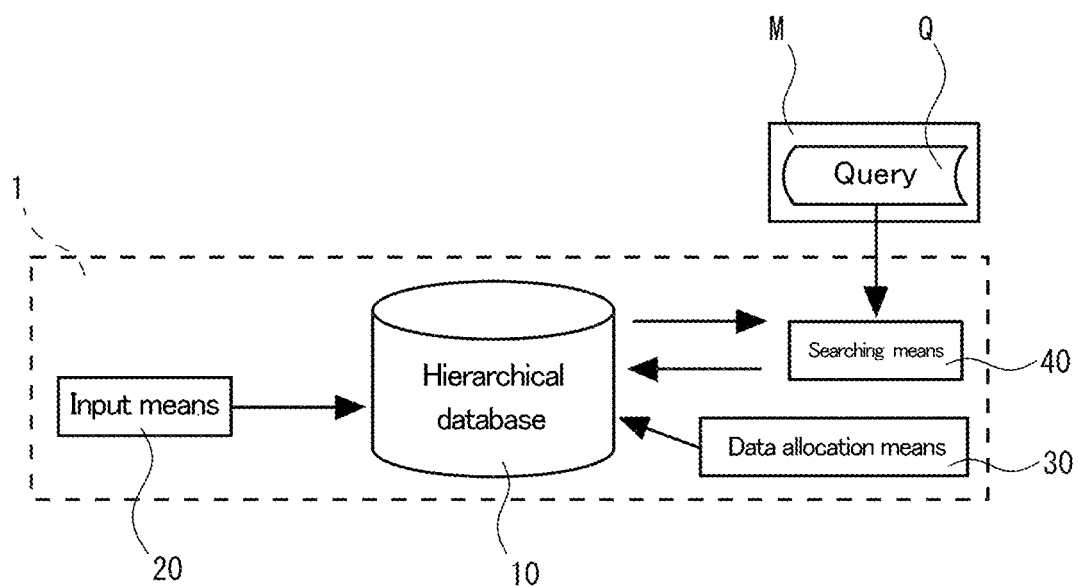
FIG. 1 is a schematic view illustrating a structure of a database management system according to one embodiment of the present invention.

First, embodiments of the present invention will be listed and described.

According to one aspect of the presently claimed invention, a database management system includes: a hierarchical database having one primary database, and a plurality of end databases connected to the primary database directly or indirectly through at least one intermediate database; and a searching means which searches, from registered data being registered in the hierarchical database, for matching data which matches a search criterion, wherein at least the end databases store a plurality of pieces of the registered data, the primary database or the intermediate database has a virtual data table in which search paths are grouped by common information relating to the plurality of pieces of the registered data, the search paths leading to the registered data stored in: a next-lower database which is the lower level-side intermediate database or the lower level-side end database, each being directly connected to the primary database or the intermediate database; or the intermediate database or the end database, each being indirectly connected to the primary database or the intermediate database through the next-lower database, and the searching means adopts, as a starting point of a search, the intermediate database or the end database which involves the common information contained in the search criterion.

Due to the database management system having the virtualized data table grouped by the common information involving the registered data and the databases in the search scope being narrowed down, a transmission amount between the next-lower database and the intermediate database(s) and/or the end database(s) being indirectly connected to this next-lower database can be reduced. Furthermore, the database management system adopts, as a starting point of the search, the intermediate database or the end database which involves the common information contained in the search criterion. Due to thus using the common information to start the search from an end side, a search can be executed by searching only the end databases and/or a part of the intermediate database(s) being in a connected relationship with the end databases. Thus, the database management system enables limiting the expansion of the processing amount in searches of the registered data, and efficiently searching the registered data.

When the searching means executes with a plurality of the search criteria simultaneously, the starting points are preferably each the intermediate databases or the end databases, and are different from each other. When, in the case in which the searching means executes with the plurality of search criteria simultaneously, the starting points are thus the intermediate databases or the end databases and are different from each other, the searches can be executed in parallel while avoiding transmissions between specific databases becoming congested, whereby searching data with further efficiency is enabled. As referred to herein, executing "simultaneously" means that, in the execution of two arbitrary searches, there is an overlapping time period in the duration from a time when a search command is sent to a time when a search result is received.

The searching means preferably has: a request function of sending a search request to the starting point; a transmission function of, with respect to the intermediate database which received the search request, transmitting the search request to all databases, from which a request origin which sent the search request is excluded, of the primary database, the intermediate database, and the end databases, each being directly connected to the intermediate database which received the search request; and an aggregation function of aggregating results for the search request and returning the results to the request origin, with respect to the primary database, the intermediate database, and the end databases which received the search request. When the searching means thus has the above-described functions, regardless of which of the intermediate database(s) or the end database(s) is/are adopted as the starting point(s) of the search, efficiently searching the registered data is enabled.

The searching means preferably has a top-level database-specifying function of, based on the virtual data table, specifying a top-level intermediate database or a top-level end database, which involves the common information contained in the search criterion. The top-level database can be quickly specified based on information in the virtual data table. Furthermore, since the top-level database and lower-level databases are connected in a tree structure, searching the registered data in parallel is facilitated. Thus, when the searching means has the top-level database-specifying function of specifying the top-level database, searching the registered data with further efficiency is enabled.

The primary database or the intermediate database preferably has a plurality of the virtual data tables in which attributes of the common information are different, wherein hierarchical structures of the hierarchical database are different from each other for each attribute, and the searching means preferably has a selection function which selects a hierarchical structure which involves the attribute contained in the search criterion. When the hierarchical structures of the hierarchical database are different from each other for each attribute and the searching means thus selects the hierarchical structure which involves the attribute contained in the search criterion, searching the registered data with further efficiency is enabled.

The database management system preferably includes a data allocation means which alters a hierarchical structure of the hierarchical database. When the database management system thus includes the data allocation means which alters the hierarchical structure of the hierarchical database, optimization of the search paths and multiplexing are enabled, thereby enabling searching the registered data with further efficiency.

The data allocation means preferably has a duplication function of making, in another end database or another intermediate database, a copy of the virtual data table and the registered data falling under the virtual data table. When the data allocation means is thus given the duplication function, multiplexing of the search paths can be easily carried out and a transmission load can be easily reduced, and in addition, in a case in which a transmission error or the like occurs in a part of the hierarchical database, searching becoming disabled can be prevented.

The duplicated registered data is preferably contained as the registered data registered in the hierarchical database, being a target of the searching means. When the duplicated registered data is thus contained as the registered data registered in the hierarchical database, being the target of the searching means, the duplicated registered data can be used in place of the registered data in a duplication source. Thus, since there can be a plurality of options as the registered data to be used, reducing the transmission load can be further facilitated.

The database management system preferably includes a virtualization means which groups multiple end databases from the plurality of the end databases based on geographical information thereof to create a virtualized end database. When the end databases are thus grouped based on the geographical information thereof, the apparent number of databases as seen from the primary database can be reduced, whereby searching the registered data with further efficiency is enabled.

The virtualization means preferably has a redundancy function of: dividing the multiple end databases included in the virtualized end database into two groups, being a first database group and a second database group; and performing reconfiguring such that each of the first database group and the second database group stores all of the registered data contained in the virtualized end database. When the virtualization means is thus given the redundancy function, reducing the transmission load can be further facilitated.

DETAILED DESCRIPTION OF EMBODIMENTS OF PRESENT INVENTION

Hereinafter, the database management system according to embodiments of the present invention is described with reference to the drawings as appropriate.

First Embodiment

A database management system 1 illustrated in FIG. 1 is a hierarchically constituted computer system which controls a hierarchically constituted database. The database management system 1 includes: a hierarchical database 10; an input means 20; a data allocation means 30; and a searching means 40.

The database management system 1 may have a registered data operation other than the searching means 40, and/or a means for conducting management processing such as data collection, deletion, renewal, and/or the like. Furthermore, the database management system 1 may be connected to a device which expresses, e.g., bitmap information such as map information, enabling referring to map data and/or the like.

Hierarchical Database

Figure 2:
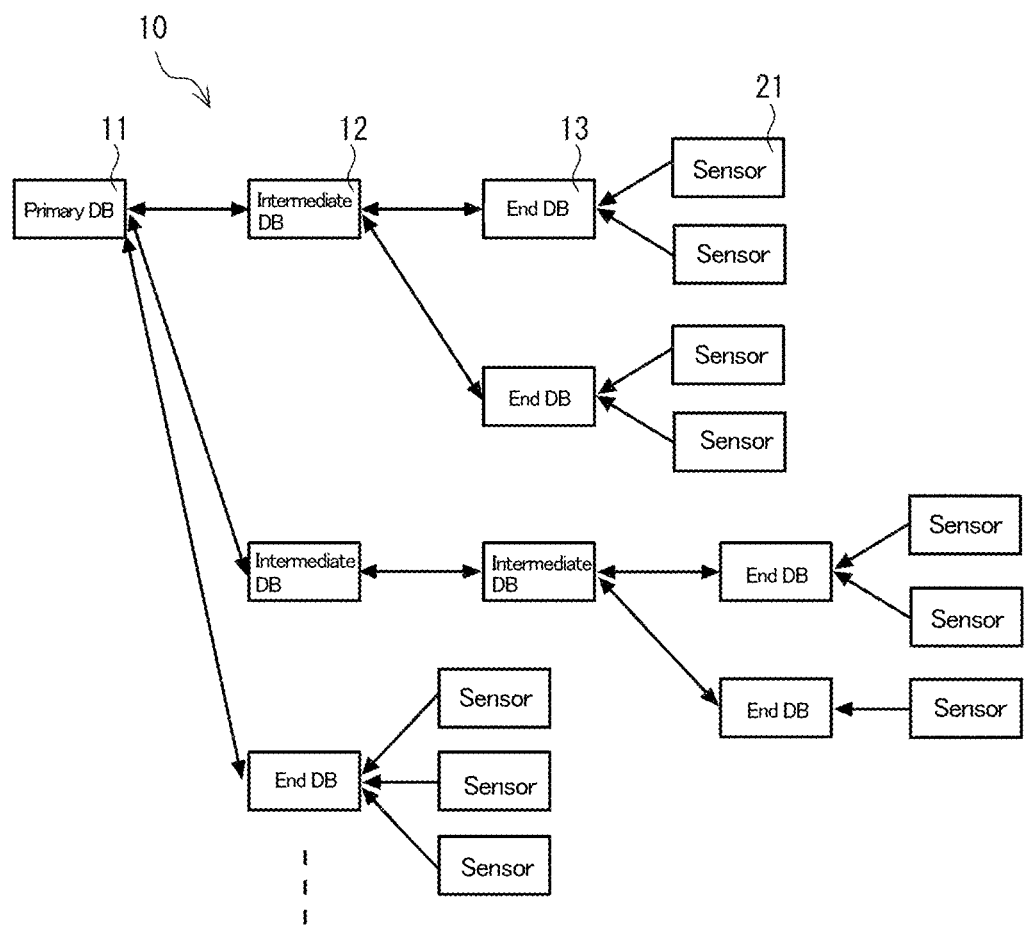
FIG. 2 is a schematic view illustrating a structure of the hierarchical database illustrated in FIG. 1.

As illustrated in FIG. 2, the hierarchical database 10 has one primary database 11; and a plurality of end databases 13 connected to the primary database 11 directly, or indirectly through an intermediate database 12.

The primary database 11 is located at a top level of a tree structure of the hierarchical database 10, and the end databases 13 are located at a bottom level thereof. The intermediate database 12 is located between the primary database 11 and the end databases 13.

As illustrated in FIG. 2, the number of intermediate databases 12 present between the primary database 11 and one of the end databases 13 is not limited to one. In other words, two or more of the intermediate databases 12 may be present between the primary database 11 and one of the end databases 13. Furthermore, the end databases 13 may be directly connected to the primary database 11, without the intermediate database 12 being present between the primary database 11 and one of the end databases 13. In addition, it is not necessary for the number of intermediate databases 12 present between the primary database 11 and each end database 13 to be the same for all of the end databases 13.

As illustrated in FIG. 2, on a lower level side of the primary database 11 and the intermediate database 12 is directly connected the intermediate database 12 or the end database 13, and the number of connections thereof is one or in a plurality of number (hereinafter, the intermediate database 12 or the end database 13 being directly connected may be collectively referred to as the "next-lower database"). Furthermore, there is no so-called cyclic connection, in which, on a further lower level side of the intermediate database 12 or the end database 13 located on the lower level side, an upper level-side intermediate database 12 or an upper level-side end database 13 is again connected.

The number of the intermediate database(s) 12 and the number of the end database(s) 13 directly or indirectly connected to one of the intermediate databases 12 are not particularly limited, and further, it is not necessary for these numbers to be the same for each intermediate database 12. On the other hand, a so-called nesting structure may be adopted such that a structure of the intermediate database(s) 12 and/or the end database(s) 13 directly or indirectly connected to a part or all of the intermediate databases 12 is identically repeated.

The primary database 11, the intermediate database 12, and the end databases 13 may be arranged in either of cloud computers or edge computers, and of these, the primary database 11 is preferably arranged in a cloud computer, and the end databases 13 are preferably arranged in edge computers. When the primary database 11 is arranged in a cloud computer, accelerating data processing is facilitated. Furthermore, when the end databases 13 are arranged in edge computers, for example, reducing a delay in transmission involving the input means 20, described later, is facilitated.

Furthermore, the primary database 11, the intermediate database(s) 12, and the end databases 13 preferably have a unique database ID for differentiating each.

In the hierarchical database 10, data is registered and stored (hereinafter, this stored data may be also referred to as "registered data"). A type of the registered data is not particularly limited. Examples thereof may include: information which can be detected by sensors, e.g., arbitrary natural phenomena such as weather or air temperature, phenomena occurring in manmade objects such as road traffic, and vital information in humans such as heartrate, respiratory rate, and blood pressure; information which is manually entered such as restaurant information; and the like.

The registered data is, for example, stored in the end databases 13. This registered data is electronic data registered in the end databases 13 by the input means 20, described later, and is generally digital data.

It is to be noted that in this embodiment, for simplification of description, hereinafter, it shall be described that all of the registered data is stored in the end databases 13, but this is not intended to preclude a part of the registered data from being stored in the primary database 11 or the intermediate database 12. The present invention functions similarly even if a part of the registered data is stored in the primary database 11 or the intermediate database 12.

Moreover, in, e.g., an initial period after building of the database, a case in which there is a single piece of the registered data is conceivable; however, there are typically multiple pieces of the registered data, and in particular, the hierarchical database 10 is configured with the presumption that a large number of pieces of the registered data will be registered. Thus, with regard to the hierarchical database 10, at least a portion, and typically all of the end databases 13 store multiple pieces of the registered data.

Input Means

The input means 20 inputs the data (registered data) to be registered in the hierarchical database 10. Specifically, the input means 20 stores the registered data processed by the database management system 1 in the end databases 13. The database management system 1 can be suitably used for databases in which the data dynamically changes. Having the input means 20 enables handling such dynamically changing data.

The input means 20 is preferably dispersedly arranged in the edge computers, together with the end databases 13. With regard to the database management system 1, as illustrated in FIG. 2, the input means 20 has sensors 21. It is to be noted that the "sensors" as referred to herein mean elements or devices that detect phenomena in the real world, and convert the detected phenomena into signals which can be processed by a computer.

One or more of the sensors 21 is/are provided with respect to each end database 13. In other words, the input means 20 has a plurality of the sensors 21 which, as a whole, automatically detect the registered data.

The registered data registered in the end databases 13 by the input means 20 is retained in an actual data table. The actual data table is, for example, a retaining area in which sensor data is permanently retained. A table structure of the actual data table is preferably the same in all of the databases. Furthermore, the table structure of the actual data table may be designed as desired, but preferably contains the table structure of the virtual data table, described later.

The actual data table may be a cyclic table. The "cyclic table" as referred to herein means a table in which the number of records that can be stored is decided in advance. In the cyclic table, the data is managed by a rule such as "first in, first out" (FIFO), "last in, first out" (LIFO), or the like. In other words, in a case of exceeding a maximum number of records, based on the rule, one specified record is overwritten by a record to be added. Columns in the cyclic table may be set to a fixed length. When the columns are thus set, a total data size of each record is identical, thereby enabling avoiding memory fragmentation arising from discrepancies in memory allocation.

Virtual Data Table

The primary database 11 and the intermediate database(s) 12 all have a virtual data table in which search paths are grouped by common information relating to the plurality of pieces of the registered data, the search paths leading to the registered data stored in: a next-lower database which is a lower level-side intermediate database 12 or a lower level-side end database 13, each being directly connected to the primary database 11 and the intermediate database 12; or the intermediate database 12 or the end database 13, each being indirectly connected to the primary database 11 and the intermediate database 12 through the next-lower database. In this embodiment, all data is stored in the end databases 13. Thus, in the virtual data table, search paths leading to the registered data stored in the lower level-side end databases 13, being directly or indirectly connected to the primary database 11 or the intermediate database 12, are configured by being grouped by the common information.

The virtual data table is a virtual retaining area which expresses a result of searching the registered data stored in the end databases 13. The virtual data table does not retain the registered data itself, and it can be regarded as a "view." The virtual data table shows a grouping of registered data in one or more of the end databases 13, located on the lower level-side, as if it were a single table.

The table structure (a record structure, a data type of each column, the maximum number of records, etc.) of the virtual data table is preferably the same for all databases. Furthermore, the data structure of the virtual data table is not particularly limited, and may be designed as desired. It is to be noted that the virtual data table contains at least data regarding the search paths and the common information.

The search paths may, for example, be configured using the database IDs of the end databases 13. On the other hand, the hierarchical database 10 is installed in a computer system, and is spread across a hierarchical computer system constituted from a cloud system, a server, edge computers, and/or the like. In this case, there may be multiple connections between computers, and various connection methods may be adopted as a connection method thereof. Thus, the search paths may be configured using paths according to connections between computers instead of the database IDs.

Hereinafter, specific structural examples of the virtual data table are explained by giving a few examples. It is to be noted that the structure of the virtual data table is not to be construed as being limited to these specific structural examples.

Specific Example 1

Figure 3:
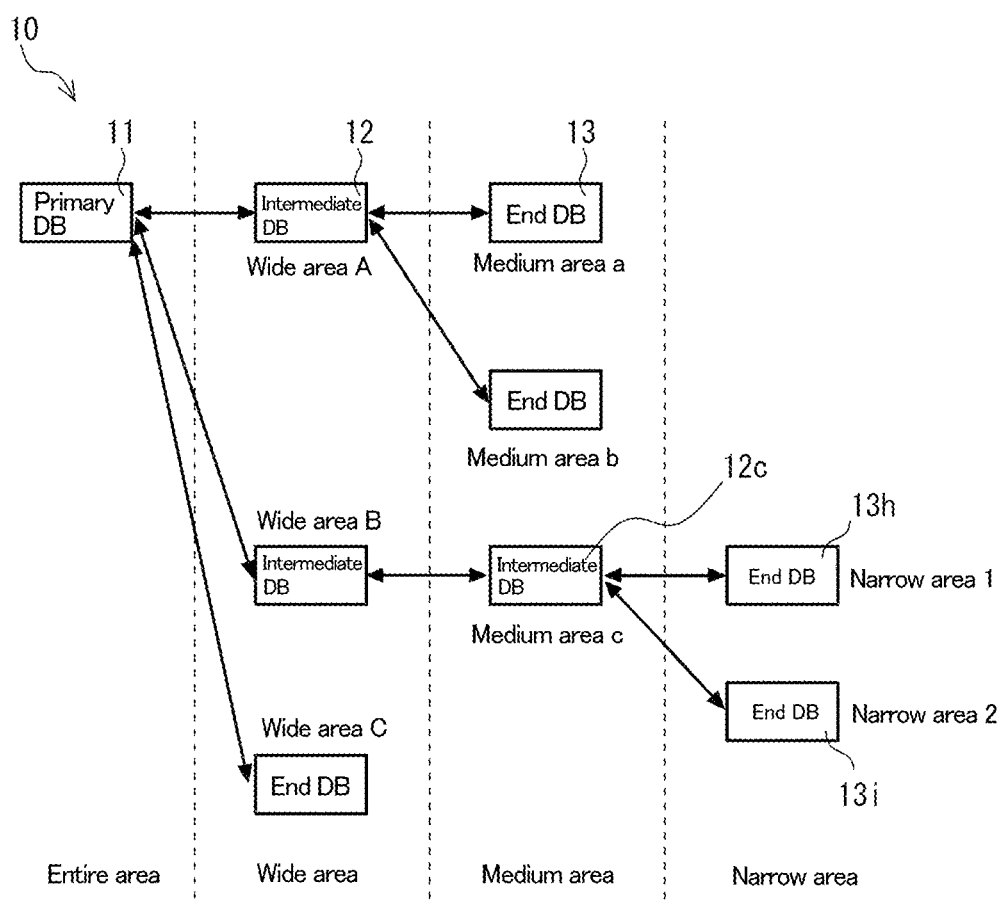
FIG. 3 is a schematic view illustrating a structural example of a hierarchical database in a case in which common information is locations.

FIG. 3 illustrates a structural example of a case in which the common information of the virtual data table is locations at which the registered data is detected. In this structural example, the primary database 11 is an entire area at which the registered data is detected, and the example shown in FIG. 3 is hierarchically constituted in the three grades of a wide area, a medium area, and a narrow area.

In this case, all of the registered data stored in one of the end databases 13 preferably falls under the same virtual data table. In a case in which the registered data stored in the one of the end databases 13 falls under, for example, two or more virtual data tables having different common information, when it is determined that other virtual data table(s) is/are in the search scope, it becomes necessary to conduct a search with respect to this end database 13. Thus, narrowing down the databases in the search scope may be insufficient. In contrast, when all of the registered data stored in the one of the end databases 13 falls under the same virtual data table, narrowing down the databases in the search scope can be carried out without being affected by the other virtual data table(s), whereby the data can be more efficiently searched.

Specifically, with regard to the database management system 1, in the case in which the input means 20 is dispersedly arranged in the edge computers together with the end databases 13, it is preferable that physical location information is used as the scope covered by each edge computer to register, in the end database 13 arranged in that edge computer, the data of the sensors 21 within the scope covered by that edge computer. When the registration is thus conducted, data having the same coverage scope is registered in the same end databases 13, and the common information relating to that data is locations.

Furthermore, the intermediate database 12 encompasses a coverage scope of a plurality of the edge computers. Moreover, in a case in which the coverage scope of the intermediate database 12 becomes too large, the intermediate database 12 itself can be hierarchically constituted. In such a case, as illustrated in FIG. 3, the number of hierarchical levels can be changed, for example, for each end database 13 in accordance with the number of pieces of the registered data. Alternatively, the intermediate database 12 may be divided into two groups, whereby the common information relating to the registered data is managed in two dimensions: for example, locations and times.

As a method for setting the locations, using physical information being latitudinal and longitudinal information is preferred. Latitudinal and longitudinal information can be comparatively easily obtained via information from GPS satellites. These types of information can be added to the actual data table together with the corresponding registered data. In such a case, the common information is the locations, and the primary database 11 or the intermediate database 12 has a virtual data table in which the locations are grouped by being within scopes defined by certain areas (coverage scopes) decided in advance.

In the example shown in FIG. 3, the search paths leading to each end database 13 adopt the primary database 11 as the starting point, and are represented by the five paths of (going to wide area A and then to medium area a); (going to wide area A and then to medium area b); (going to wide area B, then to medium area c, and then to narrow area 1); (going to wide area B, then to medium area c, and then to narrow area 2); and (going to wide area C), having each location thus subdivided as the common information. Furthermore, in, for example, the medium area c of the intermediate database 12, a location in which the narrow area 1 and the narrow area 2 are combined is the common information.

For example, in, e.g., a case in which a new end database 13 is connected to the hierarchical database 10, data regarding these search paths is collected from the end database 13 side to the primary database 11 side together with the common information to configure the virtual data table.

The virtual data table thus configured is preferably transmitted, as a common master table, to each intermediate database 12 and each end database 13 by the primary database 11. When each intermediate database 12 and each end database 13 is thus given the common master table, narrowing down of the databases in the search scope can be conducted from any database.

Alternatively, of the virtual data table, only a part containing the corresponding intermediate database 12 and end database 13 in the search paths may be transmitted, as a dispersed table, to each intermediate database 12 and each end database 13. When each intermediate database 12 and each end database 13 is thus given the dispersed table, the amount of data to be transmitted can be reduced, while maintaining the database-narrowing function. It is to be noted that in this case, at the time of collecting the data regarding the search paths and the common information from the end database 13 side to the primary database 11 side, information can be appended to the dispersed table of each intermediate database 12, so transmitting from the primary database 11 is not necessarily needed.

Specific Example 2

Figure 4:
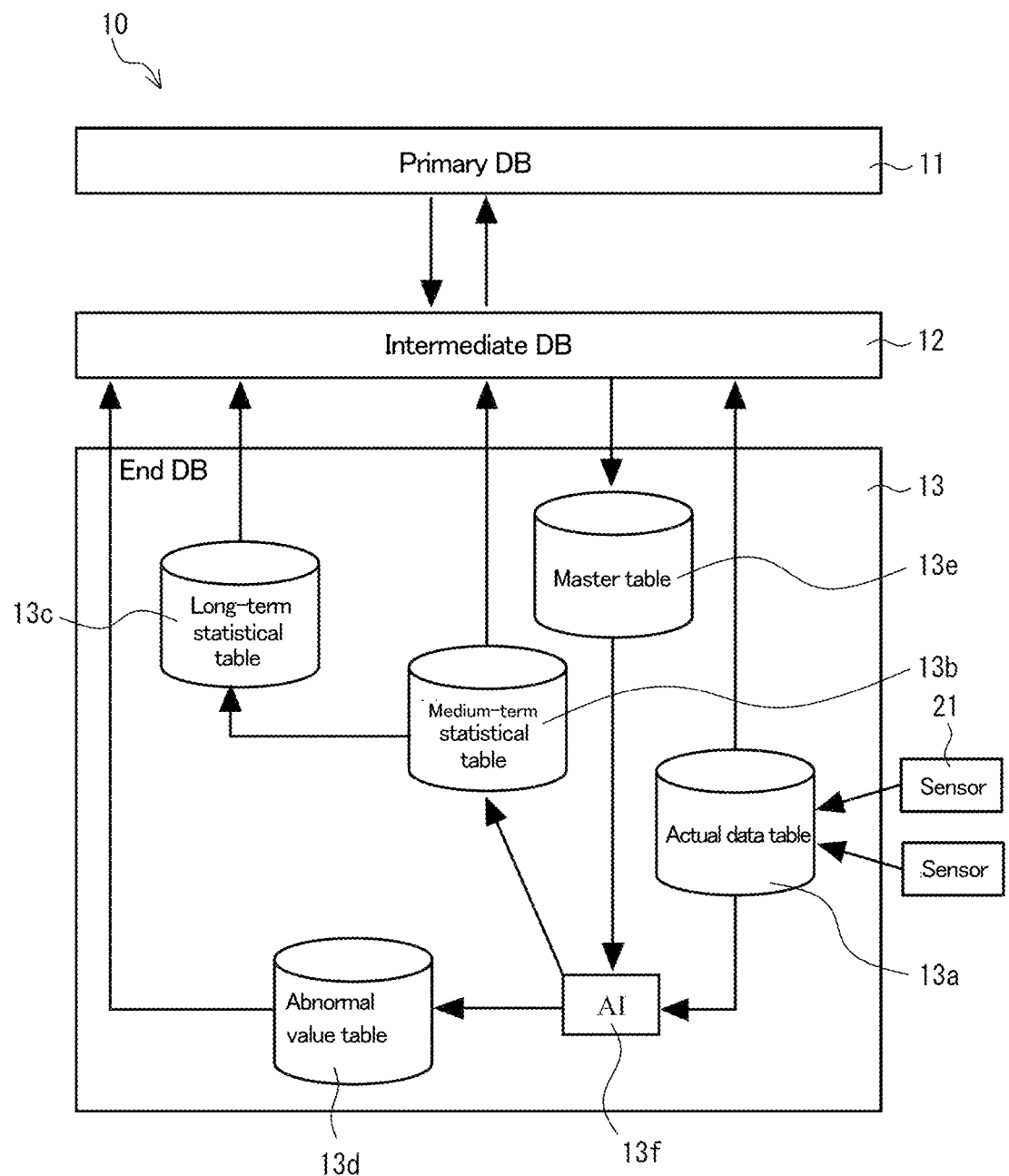
FIG. 4 is a schematic view illustrating a structural example of a hierarchical database in a case in which the common information is time periods.

FIG. 4 illustrates a structural example of a case in which the common information of the virtual data table is time periods in which the registered data was detected. In this structural example, the end database 13 has: an actual data table 13*a*; a medium-term statistical table 13*b*; a long-term statistical table 13*c*; an abnormal value data table 13*d*; a master table 13*e*; and an AI module 13*f*. It is to be noted that in FIG. 4, a case in which there is one intermediate database 12 between the primary database 11 and the end database 13 is illustrated, but the number of intermediate database(s) 12 between the primary database 11 and the end database 13 is not limited to one, and may be two or more. Furthermore, the intermediate database 12 may also have, as next lower-level databases, a plurality of the intermediate database 12 or the end database 13.

The actual data table 13*a* retains the registered data detected by the sensors 21 in chronological order. This actual data table 13*a* is realized, for example, as a cyclic table, thereby enabling retaining the registered data from the immediate past to a predetermined time period before (for example, one hour before).

The medium-term statistical table 13*b* compresses a plurality of pieces of registered data from which abnormal values have been removed from the actual data table 13*a* by the AI module 13*f*, described later, and retains medium-term (for example, two-month) chronological data. Similarly, the long-term statistical table 13*a* further compresses chronological data of the medium-term statistic table 13*b*, and retains long-term (for example, 18-month) chronological data. Furthermore, the abnormal value data table 13*d* retains a part or all of the registered data removed by the AI module 13*f*. These types of data can be realized as a cyclic table, similar to the actual data table 13*a*.

In this structure, since four tables fall under different time periods or types, different common information is set for each table. For example, the common information is the "current time" in the actual data table 13*a*, the "medium term" in the medium-term statistical table 13*b*, the "long term" in the long-term statistical table 13*c*, and "abnormal values" in the abnormal value data table 13*d*. In the database management system 1, one end database 13 may thus be grouped into a plurality of virtual data tables having different common information.

Furthermore, it is not necessary for all of the end databases 13 to have the four tables. In other words, some of the end databases 13 may not have some of the four tables. In the database management system 1, the types of tables contained in the end databases 13 can be managed by the virtual data table, so even if there are thus also end databases 13 which do not have some of the tables, the data can be efficiently searched.

In order to make the virtual data table grouped by the common information and the search paths leading to the registered data in the four tables, these pieces of data are sent to the intermediate database 12 in the next-higher level, and then further sent to the primary database 11. In the primary database 11, the virtual data table is configured from the information collected from each end database 13.

The master table 13*e* is a table which stores information common between each database in the database management system 1, and includes the common master table described in Specific Example 1. This master table 13*e* is generated by the primary database 11, and is transmitted to each end database 13.

It is preferable that parameters necessary for the AI module 13*f*, in other words, an estimation model obtained through machine learning, is transmitted to the master data table 13*e*. Since the primary database 11 is in a position which enables referring to results of the AI module 13*f* in each end database 13, the primary database 11 can improve precision of the estimation model while referring to the results in all of the end databases 13, and reflect that information to the AI module 13*f* in each end database 13. Thus, in a comparatively short time period, the precision of the AI module 13*f* in each end database 13 can be improved.

The AI module 13*f* functions as a filter which removes irregular value data (unusual data) from the actual data table 13*a*. To grasp medium-term or long-term trends of the registered data, it is preferable for the unusual data to be removed. However, the unusual data itself can be perceived as data having value, so the AI module 13*f* determines data having high value among the irregular value data, and preferentially retains it in the irregular value data table 13*d*.

It is to be noted that instead of the AI module 13*f*, the same determination can be made by a conventional deterministic evaluation module.

Specific Example 3

In Specific Example 2, an example was presented in which the data detected by the sensors 21 was used as-is as the registered data, but by utilizing the AI module and/or the like, the registered data can be stored in the end databases 13 as discriminated information.

Such a case is described using, for example, fruit harvesting information. Physical information obtained from harvested fruits includes, for example, coloring, sugar content, and the like. With respect to this, the AI module abstracts flavor (for example, juicy, rich, etc.) of the fruit from these kinds of physical information. In other words, the AI module abstracts a flavor information index from the physical information, and builds the end databases 13 with this as the common information. By thus adopting this structure, high-precision, high-efficiency searches can be carried out with, as search targets, information that differs from simple physical information in terms of a degree of abstraction.

It is to be noted that in this structure, a data table of the physical information detected by the sensors 21 is not necessarily needed, and can be stored together in the data tables as physical information.

Data Allocation Means

The data allocation means 30 alters the hierarchical structure of the hierarchical database 10. As referred to herein, altering the "hierarchical structure" includes the meanings of: changing a network connection relationship between the intermediate database 12 and the end database 13; and transferring data, such as changing the database(s) the registered data is stored in, and further, changing the registered data to be stored in two databases when it had been stored in one database.

Network Connection-Changing Function

Figure 5:
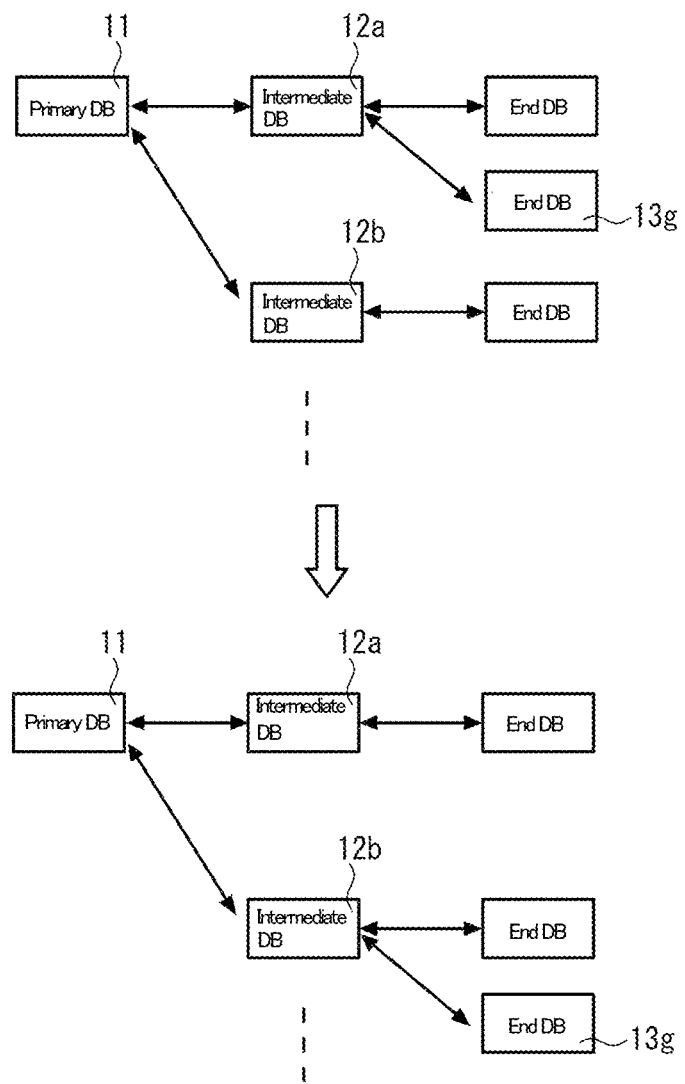
FIG. 5 is an explanatory diagram illustrating data allocation to change a network connection relationship.

The data allocation means 30 has a function of changing a network connection relationship. FIG. 5 is an example of changing this network connection relationship; the upper drawing illustrates a state before the change, and the lower drawing illustrates a state after the change. In this example, the end database 13*g* for which the connection is changed belonged to a next lower layer of a first intermediate database 12*a* before the change (FIG. 5, upper drawing), but had its network connection relationship changed by the data allocation means 30 so as to fall under a next lower layer of a second intermediate database 12*b* (FIG. 5, lower drawing). For example, in, e.g., a case in which the number of pieces of registered data falling under the first intermediate database 12*a* vastly exceeds the number of pieces of registered data falling under the second intermediate database 12*b*, such a connection change enables making uniform the number of pieces of registered data managed by each of the intermediate databases 12. Accordingly, congestion occurring in a specific communication path containing an intermediate database 12 having many pieces of registered data can be avoided, and as a result, the registered data can be efficiently searched.

Since, when a change occurs in the network connection relationship, a change also occurs in the virtual data table, the virtual data table is renewed synchronously with the connection change. It is to be noted that the change of the network connection relationship is preferably carried out such that the change in the virtual data table is minimal. This enables reducing a renewal amount in the virtual data table, and also enables preventing a decrease in the efficiency of searching the registered data after rebuilding.

It is to be noted that in FIG. 5, a case is illustrated in which the network connection relationship of the end database 13 is changed to a connection to another intermediate database 12 on the same hierarchical level, but the end database 13 can be changed to connect to the intermediate database 12 on a different hierarchical level. Furthermore, an exchange between two end databases 13 may be performed. A similar connection change can also be performed targeting the intermediate databases 12.

Database Duplication Function

Furthermore, the data allocation means 30 has a duplication function which makes, in another end database 13 or an intermediate database 12, a copy of the virtual data table and the registered data falling under the virtual data table.

Specifically, the virtual data table and the registered data stored in the end database 13 may be copied to the intermediate database 12 located on an upper level, copied to another end database 13, and/or the like. It is to be noted that in conjunction with the duplication, a change occurs in the database storing the registered data, so the virtual data table being duplicated is synchronously updated.

The registered data and the virtual data table thus duplicated (hereinafter, may be also referred to as merely "the duplicated database") can be utilized as backup data. The hierarchical database 10 is typically a massive database, with the registered data dispersedly arranged across a large number of the end databases 13. Thus, there is a significant probability of encountering a defect in which a transmission error or data loss occurs in an end database 13. Even in such a case, if there is duplicated data, searches can be executed using this as a replacement. In other words, when the data allocation means 30 is thus given the duplication function, in the case in which the transmission error or the like occurs in a part of the hierarchical database 10, searching becoming disabled can be prevented.

In light of the description above, the duplicated data is preferably located on edge computer(s) which are physically different from the original data. Furthermore, since the duplication can be performed in a short time period, this duplication function is preferably carried out without going through a computer that performs the data processing of the primary database 11.

Furthermore, the hierarchical database 10 having the duplicated data means that multiple path selections can be made with respect to the same registered data, which is to say that the search paths are multiplexed. Thus, by controlling which registered data (the original data or the duplicated data) to search in a search of the registered data, the transmission load can be reduced. In other words, when the data allocation means 30 is thus given the duplication function, multiplexing of the search paths can be easily carried out and the transmission load can be easily reduced.

In light of data protection, arranging the duplicated data in the intermediate database 12 on the next upper level is efficient. However, it is not necessarily the case that the intermediate database 12 on the next upper level has sufficient available storage space for the duplicated data to be arranged. In order to handle such a case, the data allocation means 30 preferably has a lookup function which goes back to the upper-level intermediate databases 12 and looks up the intermediate database 12 which has sufficient available storage space to enable duplicating the registered data. In the database management system 1, the intermediate database 12 where this arrangement should take place can be easily grasped by using the virtual data table.

Furthermore, the primary database 11 or, in addition to the primary database 11, the intermediate database 12 preferably has a space-retaining area in which the available storage space of the intermediate database(s) 12 and the end database(s) 13 on a lower level than that database is retained. By having such a space-retaining domain, lookup efficiency of the lookup function can be improved.

In this case, the primary database 11 preferably has a monitoring function which monitors the available storage space of the intermediate database(s) 12 and the end database(s) 13, and renews information in the space-retaining area of each database when the duplicated data fluctuates or the like.

Data Area-Expanding Function

Further, the data allocation means 30 may also provide a function of expanding the amount of data to be stored in a case in which storage of the end database(s) 13 and/or the like is insufficient.

Specifically, in a case in which storage in a certain end database 13 is insufficient and there is extra storage in another end database 13 nearby, the data allocation means 30 performs allocation to enable defining these collectively as one virtual storage, and controlling these collectively as an address space. When the address space is thus controlled collectively, a part of the data to be stored in the certain end database 13 can be stored in the other end database 13. In other words, since the data allocation means 30 conducts space management with the virtual storage, space management can be performed for the virtual storage as a whole, thereby improving storage usage efficiency.

When the above-described cyclic table is used for storing the registered data, for example, a data amount increasing excessively can be prevented by a method involving defining a validity period for data retention, appropriately limiting the data amount, and deleting data for which the validity period has passed; however, by utilizing this data area-expanding function, dynamically expanding the validity period can be easily carried out.

As described above, when the database management system 1 thus includes the data allocation means 30 which thus alters the hierarchical structure of the hierarchical database 10, optimization of the search paths and multiplexing are enabled, thereby enabling searching the registered data with further efficiency.

Security

In the hierarchical database 10, transmission of the search path information for configuring the virtual data table, and controlling duplication and network connection changes by the data allocation means 30, as described above, are carried out through a wired or wireless network. For such exchange of information over a network, security management is necessary.

Information transmitted over a network (hereinafter, may be also referred to as merely "transmitted information") is typically encrypted and transmitted over the network, decrypted in each database using a private key or the like, subjected to information operations, and then re-encrypted for sending. In the database management system 1, in addition to this encryption processing, measures such as the following may be taken.

As a security measure, search paths going through a plurality of the intermediate databases 12 preferably have a function of comparing search path information between each intermediate database 12. In the case of going through the plurality of the intermediate databases 12, the search path information thereof also contains information pertaining to the intermediate databases 12 gone through, whereby there exists a common portion. Thus, in the case of containing search path information in which no common portion exists, it can be determined that the search path information is illicit information which has infiltrated from externally. By thus laterally performing a security check between hierarchical levels, reliability of transmission information can be improved.

Furthermore, the information operation in each intermediate database 12 may be performed within an encrypted space. The information operation in the intermediate databases 12 typically involves adding information, so it can be carried out without necessarily decrypting. By thus not decrypting in the intermediate databases 12 through which the information passes, there will be no cases of passing information being read in plain text, whereby data confidentiality can be improved.

The private key is typically constituted from a typical public key and a private key. In the database management system 1, in addition to the public key and the private key, a path key using the structure in which the registered data is registered in the end databases 13 can also be set. As referred to herein, the "path key" means a key using a search path leading from the primary database 11 to the end database 13. As described before, each database (the intermediate database(s) 12 and the end databases 13) has the virtual data table or the dispersed table. Data regarding the search paths that pass through the databases is stored in these tables. On the other hand, when the search paths are recorded in order at the time of an actual search, each of these paths should match the data regarding one of the search paths stored in the tables. Using this property, whether a search path is following a correct path can be checked. By thus adding the path key, the confidentiality can be further improved.

Searching Means

The searching means 40 searches, from the registered data, for matching data which matches a search criterion. As illustrated in FIG. 1, the search criterion is, for example, transmitted as a query Q from a handheld device M.

Typically, the query Q is sent to a computer (hereinafter, may be also referred to as the "primary computer") which conducts the data processing of the primary database 11, and the search is carried out toward sequentially lower levels from the primary computer to the intermediate database 12 and the end database 13, each located in a lower level. In other words, the search is conducted with the primary database 11 as the starting point. In contrast, in the database management system 1, the searching means 40 adopts, as the starting point of the search, the intermediate database 12 or the end database 13 involving the common information of the virtual data table being contained in the search criterion.

Searches with the searching means 40 can be carried out by a method including: an extracting step; a starting point-selecting step; and a registered data-searching step. Considering as an example the case of the hierarchical database 10 in FIG. 3 in which the common information is locations, wherein the common information "medium area c" of the data table is contained in the search criterion, a searching procedure by the searching means 40 will be described.

Extracting Step

In this case, the searching means 40 first extracts the intermediate database 12 (search target intermediate database 12c) in which the common information "medium area c" is contained, and the two end databases 13 (first search target end database 13h and second search target end database 13i) positioned in the lower level.

In a case in which the virtual data table is spread to each database as the common master table, the extraction can be specified by accessing an arbitrary database and referring to the common master table.

In this case, the searching means 40 preferably accesses a nearby database, or in other words, a database near the handheld device M that transmitted the query Q. In the case in which the common information is "locations," searching information in the vicinity of the handheld device M that transmitted the query Q is likely, and there is a high probability that the database accessed is a database in which the common information "medium area c" is included. Thus, since the database accessed can be adopted as the starting point as-is, the searching efficiency can be improved.

It is to be noted that in a case in which the virtual data table is not spread to each database as the common master table, the primary database 11 is preferably accessed to directly refer to the virtual data table.

Starting Point-Selecting Step

Next, the searching means 40 selects a starting point from the databases extracted. In this case, any of the three databases can be adopted as the starting point, but adopting one of the end databases 13 as the starting point is preferred. Adopting the end database 13 as the starting point further facilitates conducting hierarchical control, described later.

Registered Data-Searching Step

The searching means 40 conducts a search adopting, as a starting point, the end database 13 selected.

In the case in which the searching means 40 adopts, as the starting point of the search, the first search target end database 13h, first the searching means 40 searches the registered data of the first search target end database 13h and extracts the matching data that matches the search criterion. The extraction of the matching data is actually carried out by an end computer which carries out the data processing of the first search target end database 13h.

Next, the searching means 40 searches the registered data of the second search target end database 13i via the search target intermediate database 12c. The searching means 40 similarly extracts the matching data that matches the search criterion, and in conjunction with the extraction result of the first search target end database 13h, sends the search result to the handheld device M via the search target intermediate database 12c.

In a case in which the search target intermediate database 12c is adopted as the starting point, the searching means 40 similarly searches the registered data of the first search target end database 13h and the second search target end database 13i in the lower level, and sends the search results to the handheld device M.

The hierarchical database 10 is typically a massive database, and a case in which the queries Q sent here become large in number simultaneously is anticipated. Thus, there are cases in which the searching means 40 is required to simultaneously execute a plurality of search criteria.

When the searching means 40 executes a plurality of the search criteria simultaneously, the starting points are preferably end databases 13 which are different from each other. For example, in the above-mentioned example, in the case in which two queries Q (a first query and a second query) including the common information "medium area c" of the data table in the search criteria are simultaneously transmitted, for the first query, the first search target end database 13h is preferably adopted as the starting point of the search for the first query, and the second search target end database 13i is preferably adopted as the starting point of the search for the second query.

In this case, since the starting points for the first query and the second query are the different end databases 13, transmission is conducted by transmission paths which differ from the search target intermediate database 12c, being located at the next-higher hierarchical level. On the other hand, in a case in which the same end database 13 is adopted as the starting point of the searches for the first query and the second query, since the transmission would be conducted by the same transmission path as the search target intermediate database 12c, being located at the next-higher hierarchical level, this transmission path becomes twice as congested. Furthermore, if the primary database 11 is adopted as the starting point of the searches for the first query and the second query, since the path leading to the search target intermediate database 12c would be the same, all transmission paths in this span become twice as congested.

When the starting points are thus the end databases 13 which are different from each other at the time of the searching means 40 executing the plurality of search criteria simultaneously, the searches can be conducted in parallel while avoiding transmissions between specific databases becoming congested, whereby searching for data with further efficiency is enabled. In particular, when the primary database 11 is adopted as the starting point, even in a case of the search criteria being different, there are many cases of upstream transmission paths overlapping and transmission congestion increasing. Thus, adopting, as the starting points, the end databases 13 which are different from each other is highly effective.

Furthermore, the searching means 40 controlling the number of queries Q which can be simultaneously executed together and controlling the number of hierarchical levels that can be retraced from the end databases 13 is also effective for mitigating the transmission congestion. These controls may be dynamically changed in accordance with a transmission load situation between each hierarchical level.

In the database management system 1, since some of the databases are extracted and searched, the transmission load in a part of the hierarchical database 10, particularly between databases which are not targeted for the search, tends to be reduced. A detection that this transmission load is at or below a certain degree may be carried out to carry out a self-diagnosis between these databases. This self-diagnosis may be performed, for example, by conducting a dummy search that makes the search means 40 cause activation between the databases. By having such a self-diagnosis function, soundness of the search paths can be secured.

Furthermore, the searching means 40 preferably conducts the search by utilizing the duplicated data duplicated by the data allocation means 30, described above. In other words, as the registered data registered in the hierarchical database 10, being the target of the searching means 40, the duplicated registered data is preferably contained. When the duplicated registered data is thus contained as the registered data registered in the hierarchical database 10, being the target of the searching means 40, the duplicated registered data can be used in place of the registered data in a duplication source. Thus, since there are a plurality of options as the registered data to be used, reducing the transmission burden can be further facilitated.

Advantages

Due to the database management system 1 having the virtualized data table grouped by the common information relating to the registered data, and the databases in the search scope being narrowed down, a transmission amount between the next-lower database and the intermediate database(s) 12 and/or the end database(s) 13 being indirectly connected to this next-lower database can be reduced. Furthermore, the database management system 1 adopts, as the starting point of the search, the intermediate database 12 or the end database 13 which involves the common information being contained in the search criterion. Due to thus using the common information to start the search from an end side, a search can be executed by searching only the end databases 13 and/or a part of the intermediate database(s) 12 being in a connected relationship with the end databases 13. Thus, the database management system 1 enables limiting the expansion of the processing amount in searches of the registered data, and efficiently searching the registered data.

Second Embodiment

Figure 6:
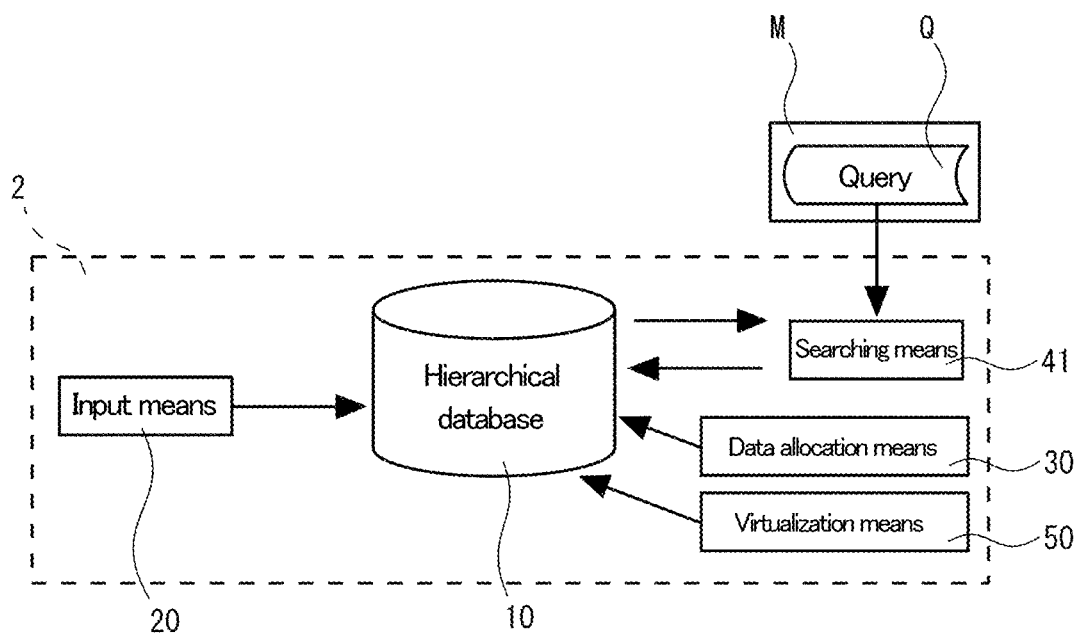
FIG. 6 is a schematic view illustrating a structure of a database management system according to an other embodiment which differs from that of FIG. 1.

A database management system 2 illustrated in FIG. 6 is a hierarchically constituted computer system which controls hierarchically constituted databases. The database management system 2 includes: a hierarchical database 10; an input means 20; a data allocation means 30; a searching means 41; and a virtualization means 50.

Hierarchical Database

As illustrated in FIG. 2, the hierarchical database 10 has one primary database 11; and a plurality of end databases 13 connected to the primary database 11 directly, or indirectly through an intermediate database 12.

The end databases 13 store a plurality of pieces of the registered data.

The primary database 11, the intermediate database 12, and the end databases 13 may be configured similarly to the primary database 11, the intermediate database 12, and the end databases 13 of the first embodiment, so a detailed explanation is omitted.

Input Means

The input means 20 may be configured similarly to the input means 20 of the first embodiment, so a detailed explanation is omitted.

Data Allocations Means

The data allocations means 30 may be configured similarly to the data allocation means 30 of the first embodiment, so a detailed explanation is omitted.

Security

Security management of the hierarchical database 10 may be similar to the security management of the first embodiment, so a detailed explanation is omitted.

Virtual Data Table

The primary database 11 or the intermediate database 12 has a virtual data table in which search paths are grouped by common information relating to the plurality of pieces of the registered data, the search paths leading to the registered data stored in: a next-lower database which is a lower level-side intermediate database 12 or a lower level-side end database 13, each being directly connected to the primary database 11 or the intermediate database 12; or the intermediate database 12 or the end database 13, each being indirectly connected to the primary database 11 or the intermediate database 12 through the next-lower database.

The virtual data table may be configured similarly to the virtual data table of the first embodiment. In the second embodiment, the primary database 11 or the intermediate database 12 has a plurality of the virtual data tables involving the attributes of the common information being different.

As referred to herein, the term "attribute" means a characteristic which is common among the common information which is grouped together. For example, in Specific Example 1 of the first embodiment, the common information was the three areas of the wide area, the medium area, and the narrow area, and the common characteristic, i.e., the attribute was "locations" at which the registered data was detected. In the case of Specific Example 2 of the first embodiment, the common information was the four items of the current time, the medium term, the long term, and abnormal values, and the attribute was "time periods" in which the registered data was detected. Hereinafter, a description is provided considering, as an example, a case in which the number of virtual data tables is two and the different attributes are the above-described "locations" and "time periods," but the number of virtual data tables and the attributes are not to be construed as being limited thereto.

In the database management system 2, the hierarchical structure of the hierarchical database 10 differs for each of the attributes. For example, in the case in which the attribute is "locations," the hierarchical structure of the hierarchical database 10 is configured as in FIG. 3. On the other hand, in the case in which the attribute is "time periods," the hierarchical structure of the hierarchical database 10 is configured as in FIG. 7, being different from that of FIG. 3. Specifically, between these two cases, the intermediate database 12 in the hierarchical level directly above one end database 13*i* is different.

Figure 7:
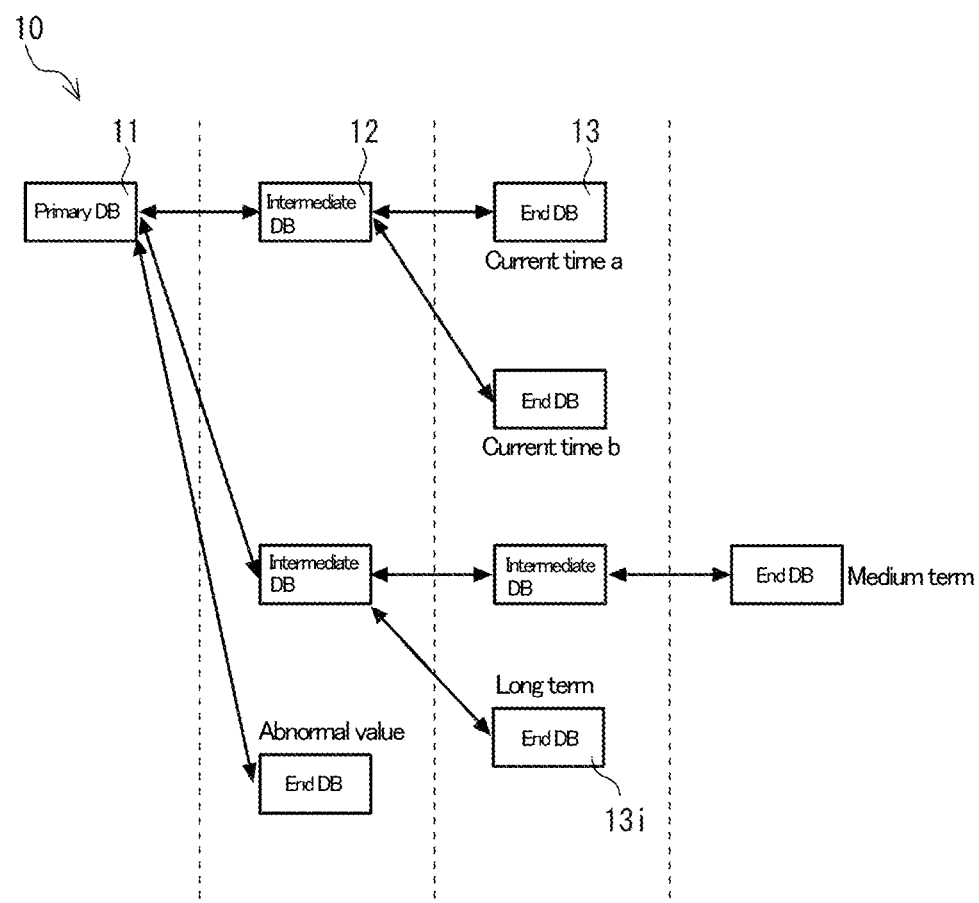
FIG. 7 is a schematic view illustrating a structural example of the hierarchical database in the case in which the common information is time periods.

At this time, for example, as illustrated in FIG. 7, the hierarchical structure is preferably configured such that end databases 13 having the same common information fall under the same intermediate database 12. When the structure is thus carried out, there are more opportunities of being able to determine, at a time of reaching a certain intermediate database 12, that there is no registered information matching the search criterion in a lower level thereof. In such a case, the databases in a further lower level can terminate the search, whereby searching the registered data with further efficiency is enabled. In the database management system 2, since the hierarchical structure of the hierarchical database 10 is made to be different for each of the attributes, the hierarchical structure can be optimized for each attribute. Thus, there are more opportunities of being able to terminate the lookup, whereby the efficiency of searching data can be improved.

These two hierarchical structures may each be registered in the hierarchical database 10 in accordance with each attribute, or, for example, using the network connection-changing function of the data allocation means 30, the hierarchical structure can be dynamically switched in accordance with the attribute or search criterion to be used.

In the case of dynamically switching the hierarchical structure, the hierarchical structure is preferably configured by changing a degree of abstraction of the attribute for each hierarchical level in accordance with the search criteria. In other words, it is preferable to adopt a structure in which a conceptual tag, having few categories, is given to the intermediate database 12 at an upper hierarchical level, and in approaching the lower levels, tags having a more specific, physical meaning are given. When such a structure is adopted, many databases can be excluded from a search at a comparatively early stage, whereby the efficiency of data searches can be improved.

As a specific example, for example, assume a case of extracting, from images of people who have entered an amusement park, specific images (for example, of lost children). In a case in which the search criteria contain, for example, "a girl wearing red clothes who entered the gates at around 2:30," from the upper-level side, the intermediate database 12 directly below the primary database 11 is hierarchically constituted by having gender as a tag. In this way, searches of databases having boys as the common information, expected to apply to about half of the registered data, can be terminated quickly. Similarly, it is preferable to adopt a structure in which, directly below the intermediate database 12 having gender as the tag, the intermediate database 12 has a time slot as a tag, and that the intermediate database 12 or the end database 13 further directly below that has clothing color as a tag. When such a structure is adopted, a hierarchical structure enabling efficiently searching data with respect to the search criteria can be adopted.

Searching Means

The searching means 41 searches, from the registered data registered in the hierarchical database 10, for matching data which matches a search criterion. The searching means 41 adopts, as a starting point for the search, the intermediate database 12 involving the common information being contained in the search criterion. As illustrated in FIG. 6, the search criterion is, for example, transmitted as the query Q from a handheld device M.

In the database management system 2, the searching means 41 preferably includes: a selection function of selecting the hierarchical structure involving the attribute being contained in the search criterion; a request function of sending a search request to the starting point; a transmission function of, with respect to the intermediate database 12 which received the search request, transmitting the search request to all databases, from which a request origin which sent the search request is excluded, of the primary database 11, the intermediate database 12, and the end databases 13, each being directly connected to the intermediate database 12 which received the search request; and an aggregation function of aggregating results for the search request and returning the results to the request origin, with respect to the primary database 11, the intermediate database 12, and the end databases 13 which received the search request.

Selection Function

Specifically, in the case in which the "location" is contained in the search criterion, the selection function selects the hierarchical structure of the hierarchical database 10 illustrated in FIG. 3, and in the case in which the "time period" is contained in the search criterion, the selection function selects the hierarchical structure of the hierarchical database 10 illustrated in FIG. 7. It is to be noted that in a case in which both the "location" and the "time period" are contained in the search criteria, or in a case in which neither is contained, both of the hierarchical structures may be selected.

Request Function

The request function first selects the starting point in a manner similar to that of the starting point-selecting step of the first embodiment. At this time, of the common information contained in the search criteria, it is preferable that the common information corresponding to the attribute of the hierarchical structure selected by the selection function is extracted, and the intermediate database 12 containing at least the common information is adopted as the starting point.

Next, the request function conveys the search criterion to the starting point.

Transmission Function

The transmission function operates recursively.

First, with respect to the intermediate database 12 serving as the starting point, a search request is conveyed to all of the primary database 11, the intermediate databases 12, and the end databases 13 directly connected to the starting point. Specifically, the search criterion is conveyed. It is to be noted that the request origin which sent the search request is excluded, but the search request to the starting point is sent from the query Q and is not a database, so no databases are excluded.

The intermediate database 12 and/or the like, to which the search criterion was conveyed, transmits the search request to, among the primary database 11, the intermediate databases 12, and the end databases 13, each being directly connected to the intermediate database 12, all databases except for the request origin which sent the search request.

It is to be noted that at this time, in a case in which registered information which matches with the search criterion is not registered in the lower-level databases or the databases located in a still lower level targeted for the transmission, instead of the transmission of the search request, returning, to the database serving as the request origin, a message that there is no corresponding data is preferred. Hereinafter, such a database may be also referred to as a terminal database.

Aggregation Function

When the search request is transmitted to the end database 13 or the terminal database, there are no databases for furthering transmit the search request. In this case, the aggregation function aggregates the registered data which matches the search request, and returns the aggregated results to each database serving as the request origin.

Each database serving as the request origin waits for the aggregated results to return from all of the databases to which it sent the search request, and further conveys the aggregated results to the database serving as the request origin for this database.

When the aggregated results are thus conveyed, lastly, the aggregated results are collected at the intermediate database 12 being the starting point. Then, the intermediate database 12 being the starting point can send the aggregated results to the query Q, being the origin of the search request to the starting point, ending the series of searches.

Virtualization Means

Figure 8:
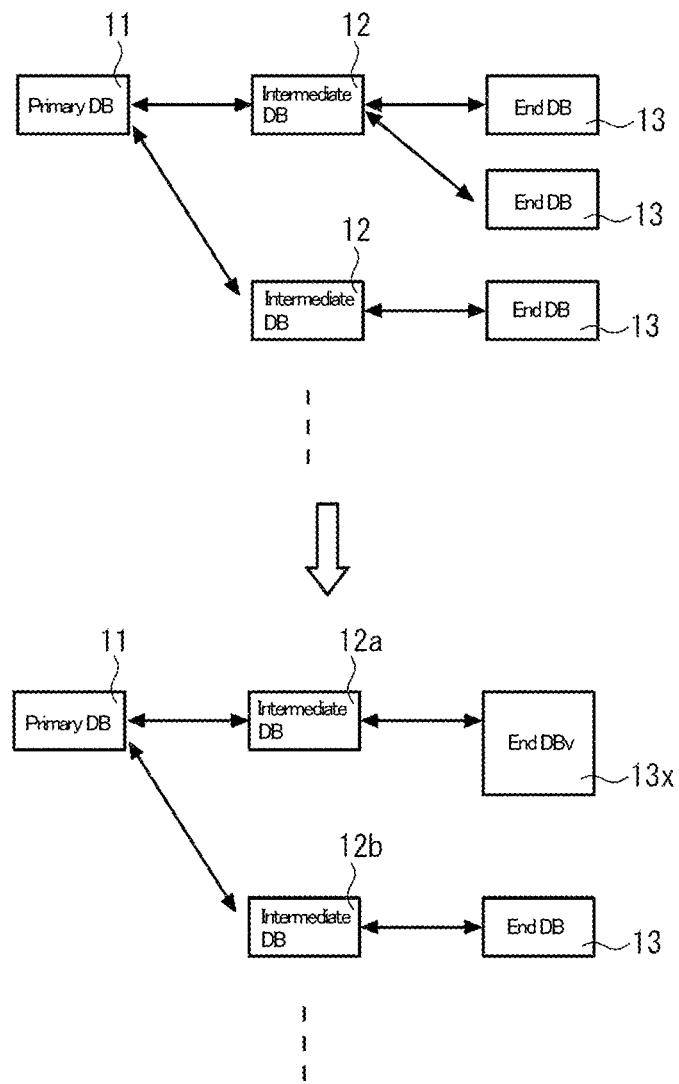
FIG. 8 is an explanatory diagram describing an operation of a virtualization means.

As illustrated in FIG. 8, the virtualization means 50 groups multiple end databases 13 of the plurality of end databases 13 based on their geographical information to create a virtualized end database 13x. The virtualized end database 13x thus built can be treated as one end database 13. It is to be noted that in FIG. 8, an example is illustrated in which two end databases 13 are grouped to create one virtualized end database 13x, but the number of end databases 13 to group and the number of virtualized end databases 13x are not limited thereto.

Figure 9:
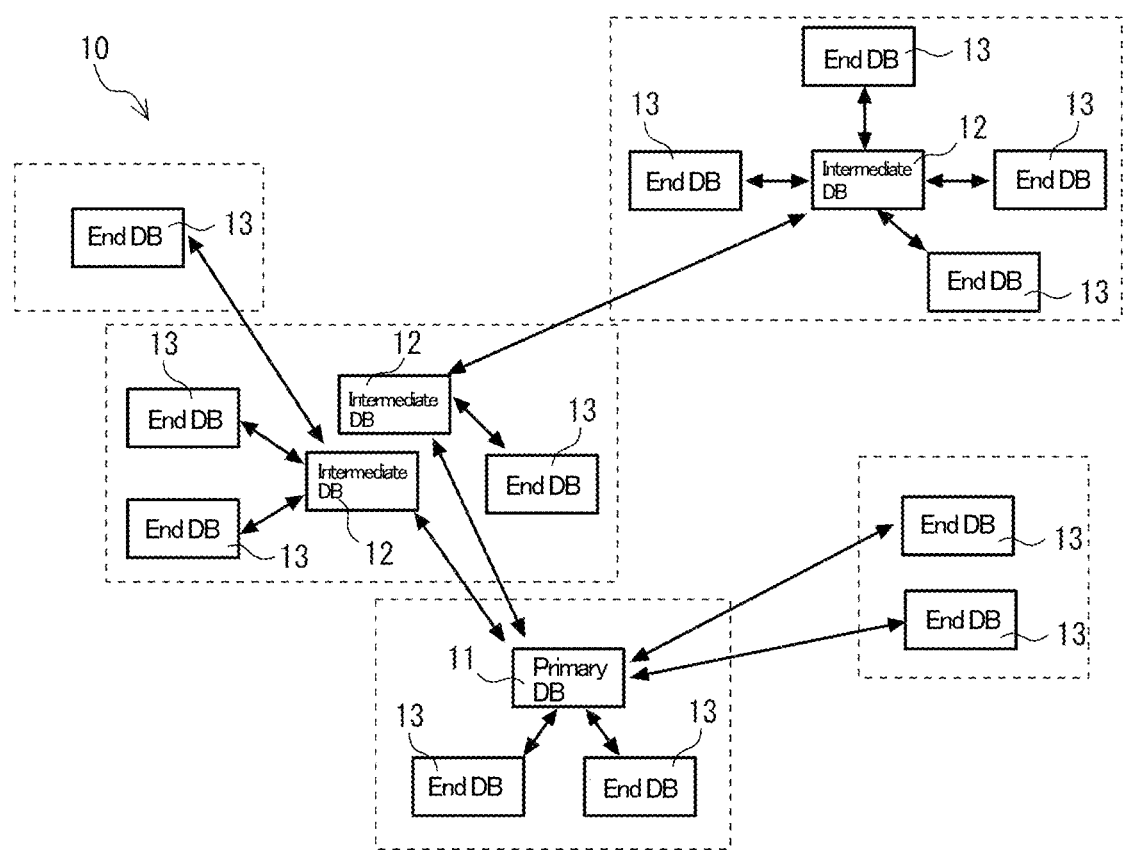
FIG. 9 is an image diagram illustrating a geographical location of each database in the hierarchical database.

As described above, the grouping is conducted based on the geographical information. That is to say, the nearby end databases 13 are grouped into one virtualized end database 13x. To describe specifically, as illustrated in FIG. 9, the primary database 11, the intermediate databases 12, and the end databases 13 are geographically dispersedly present, for example, around Japan or throughout the world, and these are tied together by the network. From these, the ones that are geographically close in distance, for example, the end databases 13 inside the dashed lines, are virtualized as one virtualized end database 13x. A standard for this grouping, for example, may be databases within a certain longitudinal/latitudinal scope, or may be in accordance with a geographical division such as municipality names.

It is to be noted that in FIG. 9, a two-dimensional plane, i.e., a nearby area of databases in one layer, is defined, but the database management system may also be defined by a plurality of layers. For example, assuming a case of a database management system adopting fabrics as targets, in which the first layer expresses cloth material, the second layer expresses texture, and the third layer expresses a sense of luxury, the database management system is preferably a three-layer structure, involving building a hierarchical database having, in each layer, a primary database, intermediate database(s), and end database(s). The structure being thus adopted with multiple layers enables, for example, an AI module to efficiently extract information from the registered data. Furthermore, searching across multiple layers is enabled.

Figure 10:
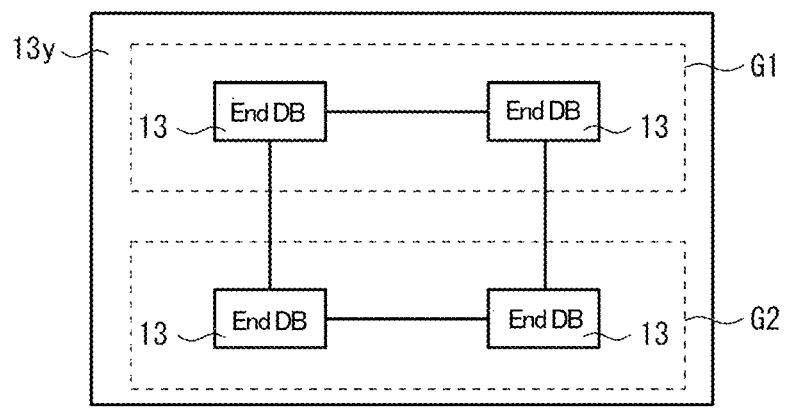
FIG. 10 is a schematic view illustrating a structure of a virtualized end database.

Using FIG. 10, a virtualized end database 13y will be described in detail. It is to be noted that in the virtualized end database 13y of FIG. 10, four end databases 13 are grouped together, but the number of end databases 13 is not limited thereto.

The multiple end databases 13 contained in the virtualized end database 13y preferably have a transmission link enabling mutual transmission within the virtualized end database 13y. In FIG. 10, a ring-shaped transmission link is configured between the four end databases 13, enabling mutual transmission. As the transmission link, various structures aside from the ring shape, such as a mesh shape or a star shape, may be adopted. When the transmission link is thus configured, treating the virtualized end database 13y as one end database 13 is facilitated.

The virtualization means 50 preferably has a redundancy function which divides the multiple end databases 13 contained in the virtualized end database 13y into two groups, being a first database group G1 and a second database group G2, and performs reconfiguring such that each of the first database group G1 and the second database group G2 stores all of the registered data contained in the virtualized end database 13y. When the virtualization means 50 is thus given the redundancy function, since there can be a plurality of options as the registered data to be used, reducing the transmission burden can be further facilitated.

Figure 11:
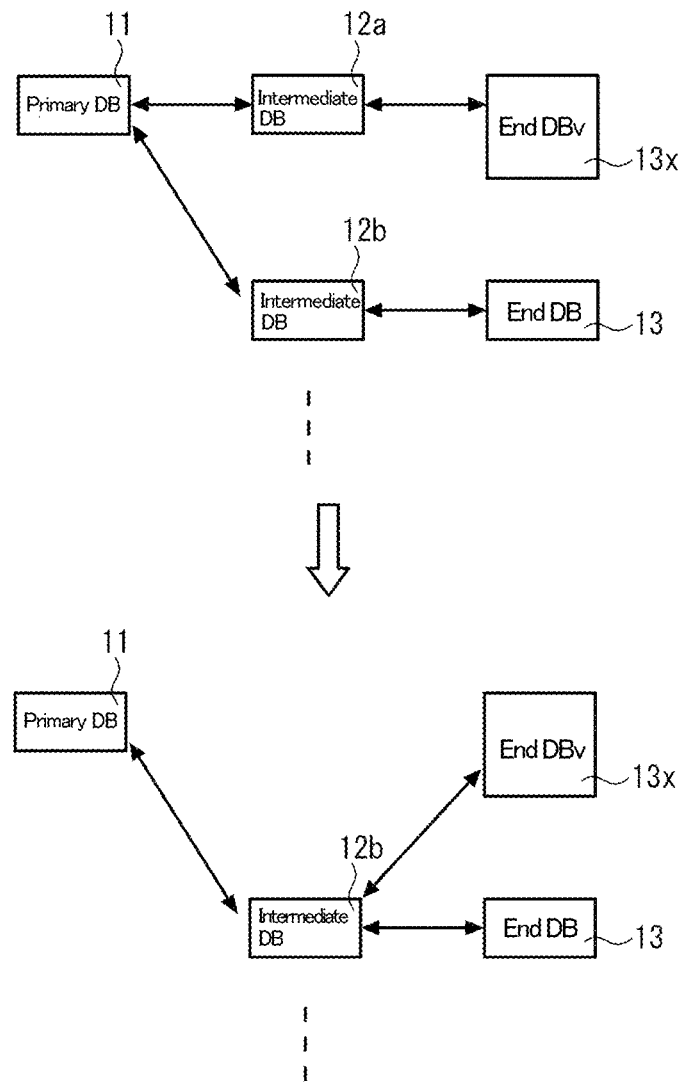
FIG. 11 is an explanatory diagram illustrating a case in which an intermediate database is further included by an operation of the virtualization means in FIG. 8.

As illustrated in FIG. 11, the virtualization means 50 enables further integrating an intermediate database 12a into the virtualized end database 13x. In FIG. 11, the process of incorporating the intermediate database 12a after the grouping of the two end databases 13 illustrated in FIG. 8 is illustrated for expediency, but these operations can be executed simultaneously.

Furthermore, the virtualization means 50 may, as needed, change the hierarchical structure of the virtualized end database 13x at the same time as building the virtualized end database 13x. For example, in FIG. 11, the virtualized end database 13x is changed to be arranged immediately below the intermediate database 12b, despite normally being arranged immediately below the primary database 11. Such a hierarchical structure change is preferably made so as to advance grouping each database by the common information.

Advantages

With regard to the database management system 2, due to the searching means 41 having the request function, the transmission function, and the aggregation function, regardless of which intermediate database 12 or end database 13 is/are adopted as the starting point(s) of the search, efficiently searching the registered data is enabled.

Furthermore, since in the database management system 2, for each of the attributes, the hierarchical structure of the hierarchical database 10 is different and the searching means 41 selects the hierarchical structure involving the attribute being contained in the search criterion, searching the registered data with further efficiency is enabled.

Moreover, the database management system 2 includes the virtualization means 50. When the end databases 13 are grouped by the virtualization means 50 based on the geographical information thereof, the apparent number of databases as seen from the primary database 11 can be reduced, whereby searching the registered data with further efficiency is enabled.

Other Embodiments

The above-described embodiments are not to be construed as limiting the constitution of the present invention. Therefore, constituent elements of each part of the above-described embodiments may be omitted, replaced, or added based on the description in the present specification and common technical knowledge, and such omission, replacement, and addition should be construed as falling within the scope of the present invention.

In the above-described embodiments, the case in which the database management system includes the data allocation means was described, but the data allocation means is not a necessary constituent feature, and the database management system not including the data allocation means also falls within the intended scope of the present invention.

Furthermore, in the above-described embodiments, the case in which the data allocation means has both the network connection relationship-changing function and the duplication function was described, but the data allocation means having only one of these functions also falls within the intended scope of the present invention.

In the above-described embodiments, the case in which all of the registered data is stored in the end databases was described, but this is not a necessary constituent feature, and the present invention includes a case in which a part of the registered data is stored in the end databases. In other words, the present invention does not preclude the primary database or the intermediate database from storing the registered data. For example, the database management system may have a mechanism in which data from the sensors is stored in the intermediate database. However, in light of efficiency of data processing, there is preferably less of the registered data stored in the primary database and/or the intermediate database than in the end databases, and more preferably, all of the registered data is stored in the end databases.

In the above-described embodiments, the case in which the input means has sensors was described, but for example, the input means may be, instead of sensors, a human interface such as a keyboard. Using the human interface enables using information which is manually entered, such as restaurant information, as the registered data. Furthermore, the input means is not a necessary constituent feature, and may be omitted. In this case, prebuilt databases are registered in the hierarchical database. As a method for registering the prebuilt databases, for example, a method using a medium such as DVD, or transmission over network can be exemplified.

Figure 12:
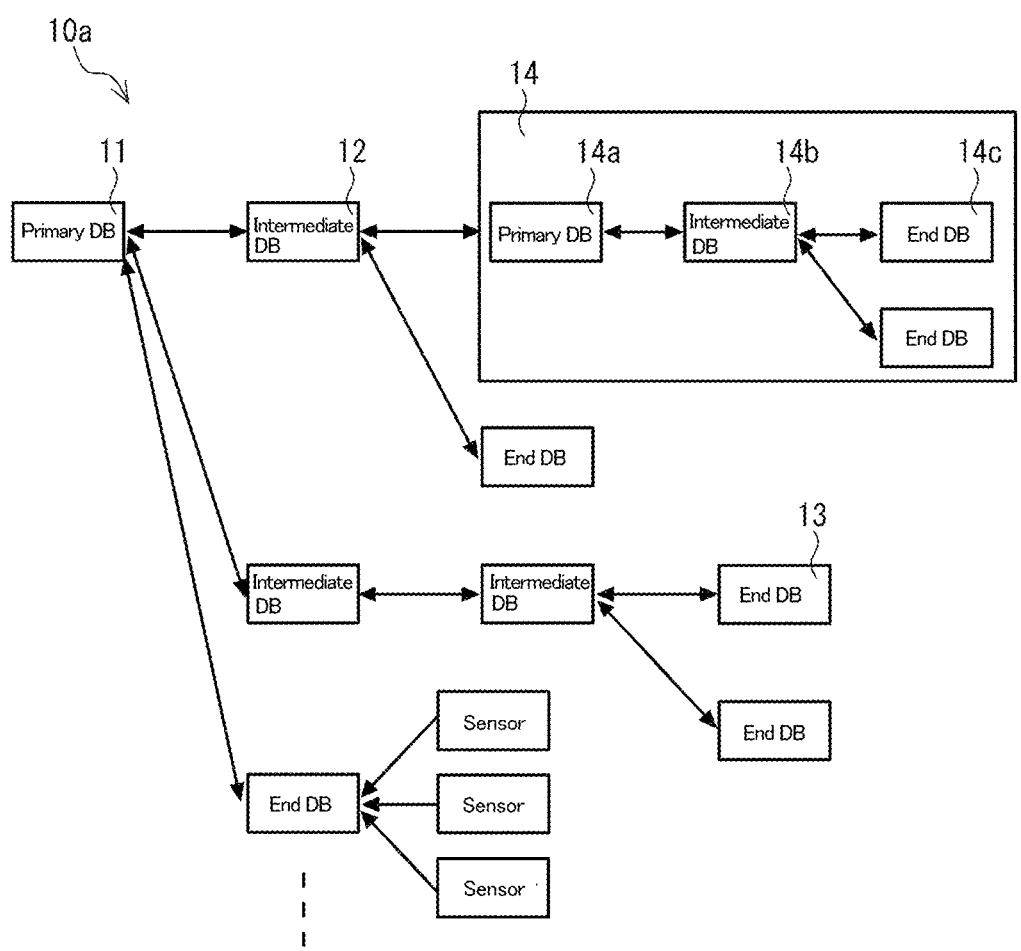
FIG. 12 is a schematic view illustrating a structural example of a multiplexing hierarchical database.

The database management system may also manage a multiplexing hierarchical database 10a such as that illustrated in FIG. 12. The hierarchical database 10a may be used instead of the hierarchical database 10 in the database management system 1 of FIG. 1.

The multiplexing hierarchical database 10a is such that a part or all of the end databases 13 of the hierarchical database 10 illustrated in FIG. 2 are replaced with a sub-hierarchical database 14. In other words, the database management system includes a hierarchical database 10a having: one primary database 11; and a plurality of end databases 13 and at least one sub-hierarchical database 14, each being connected to the primary database 11 directly, or indirectly through at least one intermediate database 12.

The sub-hierarchical database 14 has: one primary sub-database 14a; and a plurality of end sub-databases 14c connected to the primary sub-database 14a directly, or indirectly through at least one intermediate sub-database 14b. The sub-hierarchical database 14 is connected to the primary database 11 or the intermediate database 12, each having the sub-hierarchical database as a next-lower database, through the primary sub-database 14a.

A method of connecting the sub-hierarchical database 14 to the primary database 11 or the intermediate database 12, each having the sub-hierarchical database 14 as the next-lower database, is not particularly limited, and for example, a well-known gateway method may be employed. When the gateway method is employed, the sub-hierarchical database 14 can be defined as one independent closed area.

In the case of defining the sub-hierarchical database 14 as one independent closed area, the sub-hierarchical database 14 can be managed with security having different strengths. Furthermore, with regard to a transmission method as well, different transmission methods can be employed. When the multiplexing hierarchical database 10a is thus employed, configuring different security management and/or transmission methods is facilitated. Particularly with regard to the transmission method, when, e.g., a transmission frequency is altered in accordance with a network load for each sub-hierarchical database 14, the transmission congestion of the hierarchical database 10a as a whole can be mitigated.

With regard to the sub-hierarchical database 14, the end sub-databases 14c store a plurality of pieces of the registered data, and the primary sub-database 14a or the intermediate sub-database 14b has a virtual sub-data table in which search paths are grouped by common information relating to the plurality of pieces of the registered data, the search paths leading to the registered data stored in: a next-lower database which is a lower level-side intermediate sub-database 14b or a lower level-side end sub-database 14c, each being directly connected to the primary sub-database 14a or the intermediate sub-database 14b; or the intermediate sub-database 14b or the end sub-database 14c, each being indirectly connected to the primary sub-database 14a or the intermediate sub-database 14b through the next-lower database.

The virtual sub-data table is a data table used only within the sub-hierarchical database 14. To the upper-level hierarchical database 10a, the sub-hierarchical database 14 functions as one end database 13. However, in the hierarchical database 10a, the common information contained in the sub-hierarchical database 14 matches a part or all of the common information contained in the primary sub-database 14a of the sub-hierarchical database 14.

In FIG. 12, the hierarchical database 10a has one sub-hierarchical database 14, but the number thereof is not limited to one, and may be two or more. Furthermore, the sub-hierarchical database 14 may further have sub-hierarchical database(s).

The sub-hierarchical database 14 may, for example, be installed in a moving body such as a vehicle. In this instance, there may be a case in which the primary database 11 or the intermediate database 12 to which the sub-hierarchical database 14 is to be connected changes in accordance with movement of the moving body. In such a case, it is preferable, for example, for the data allocation means to change the network connection relationships to be optimal.

In the multiplexing hierarchical database 10a as well, the searching means adopts, as the starting point of a search, the intermediate database 12 or the end database 13 involving the common information of the virtual data table being contained in the search criterion. In the case in which the sub-hierarchical database 14 is contained in the database involving the common information of the virtual data table being contained in the search criterion, the sub-hierarchical database 14 is considered to be one end database 13, and the primary sub-database 14a thereof may be adopted as the starting point, or the intermediate sub-database 14b or the end database 14c within the sub-hierarchical database 14 may be adopted as the starting point.

In the above-described embodiments, the case was described in which at the time of the searching means executing a search, after executing the search of the end database which serves as the starting point, the searching means moves to the next-higher intermediate database and executes searches of other end databases. In contrast, a structure may also be adopted in which the searching means has a top-level database-specifying function which, based on the virtual data table, specifies a top-level intermediate database or a top-level end database involving the common information being contained in the search criterion, wherein the search of the registered data is started from the top-level intermediate database or the top-level end database.

In this case, the searching means determines, with respect to the end database which serves as the starting point, whether the next-higher intermediate database has the same common information based on the virtual data table. In a case in which the next-higher intermediate database does not have the same common information, the end database which served as the starting point is the top-level database. In a case in which the next-higher intermediate database has the same common information, the searching means determines whether the still next-higher intermediate database with respect to this intermediate database has the same common information. This determination is repeated, and an intermediate database for which the next-higher intermediate database does not have the same common information is specified, and this specified intermediate database is defined as the top-level database. The search of the registered data is started from this top-level database.

The top-level database can be quickly specified based on the information in the virtual data table. Furthermore, since the top-level database and lower-level databases are connected in a tree structure, searching the registered data in parallel is facilitated. Thus, when the searching means includes the top-level database-specifying function which specifies the top-level database, searching the registered data with further efficiency is enabled. Furthermore, the common information, or in other words, the search criterion, is not transmitted to the intermediate database or the primary database positioned further above the intermediate database or the end database specified as the top-level database. Thus, since in the case of the multiplexing hierarchical database, the search criterion being leaked to the database(s) on an upper level side is prevented, improving information confidentiality is also enabled.

The searching means of the above-described embodiments are not limited to each embodiment. For example, the searching means employed in the first embodiment can be employed in the second embodiment, and conversely, the searching means employed in the second embodiment can be employed in the first embodiment.

The selection function of the searching means employed in the second embodiment may be employed in the first embodiment. Furthermore, a structure in which the selection function is not included in the database management system of the second embodiment is also possible.

The virtualization means employed in the second embodiment may be employed in the first embodiment. Furthermore, a structure in which the virtualization means is not included in the database management system of the second embodiment is also possible.

In the second embodiment, the case was described in which the virtualization means groups the plurality of end databases based on their geographical information to create one virtualized end database, but the standard for grouping is not limited to geographical information. In a case in which the plurality of end databases have an attribute constituted from elements which enable defining distance therebetween, grouping can be carried out based on the distance information of the attribute. For example, in the case of the geographical information, the attribute is geographical location, and the distance can be defined by, e.g., physical distance.

Figure 13:
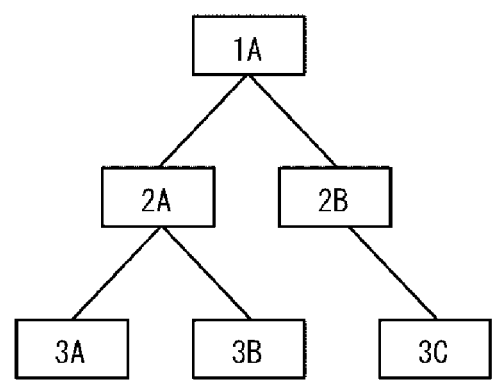
FIG. 13 is an explanatory view illustrating distances for an attribute having a hierarchical structure.

An attribute having a hierarchical structure can be exemplified as such an attribute. For example, biological classifications (kingdom, phylum, class, order, family, genus, species), company organizations (department, section, group, etc.), and the like correspond to this. Also regarding geographical information, mentioned before, for example, in the case of adopting administrative divisions such as prefectures, municipalities, and/or the like as the attribute, this attribute has a hierarchical structure. In the case of the attribute having such a hierarchical structure, elements having a high degree of relevance between upper and lower hierarchical levels are tied together and hierarchically constituted in a tree shape (for example, see FIG. 13). There is a connected relationship from a certain element to an other element through branches of the tree, and the number of branches to pass in order to arrive from the certain element to the other element (in a case in which there are a plurality of paths, the minimum value) can be defined as the distance between these. For example, in FIG. 13, from element 3A to element 3B can be reached by a path involving going from 3A to 2A to 3B, whereby the number of branches to pass is two; thus, the distance is two. On the other hand, in the case of going from the element 3A to element 3C, it is necessary to follow a path involving going from 3A to 2A to 1A to 2B to 3C, whereby the number of branches to pass is four; thus, the distance is four, which can be determined as being further than the distance between 3A and 3B.

INDUSTRIAL APPLICABILITY

As described above, the database management system of the present invention enables limiting the expansion of the processing amount in searches of data, and efficiently searching the data.

EXPLANATION OF THE REFERENCE SYMBOLS 1, 2 database management system
10, 10a hierarchical database
11 primary database
12 intermediate database
12a first intermediate database
12b second intermediate database
12c search target intermediate database
13 end database
13a actual data table
13b medium-term statistical table
13c long-term statistical table
13d abnormal value data table
13e master table
13f AI module
13g end database having changed connection
13h first search target end database
13i second search target end database
13x, 13y virtualized end database
14 sub-hierarchical database
14a primary sub-database
14b intermediate sub-database
14c end sub-database
20 input means
21 sensor
30 data allocation means
40, 41 searching means
50 virtualization means
G1 first database group
G2 second database group

What is claimed is:
1. A database management system comprising:
a hierarchical database comprising:
  a primary database;
  a plurality of end databases connected to the primary database directly, or indirectly through at least one intermediate database; and
a searching unit comprising at least one processor configured to control the hierarchical database, wherein
at least the end databases store a plurality of pieces of registered data,
at least one of the primary database or the intermediate database comprises a virtual data table, the virtual data table storing search paths which are grouped by common information relating to the plurality of pieces of the registered data, the search paths leading to the registered data stored in:
  a next-lower database which is a lower level-side intermediate database or a lower level-side end database, each being directly connected to the primary database or the intermediate database; or the intermediate database or the end database, each being indirectly connected to the primary database or the intermediate database through the next-lower database, the at least one processor is configured to perform:

an extracting process in which the intermediate database or the end database which stores the common information included in a search criterion of a search is extracted by referring to the virtual data table;

a starting point-selecting process in which the intermediate database or the end database which includes the common information is selected as a starting point of a search; and a searching process which searches matching data which matches the search criterion from the registered data which are registered in the hierarchical database.

2. The database management system according to claim 1, wherein when there are a plurality of the search criteria simultaneously, the at least one processor performs the starting point-selecting process, such that the starting points are different from each other.

3. The database management system according to claim 1, wherein the at least one processor is further configured to:
send a search request to the starting point;
with respect to the intermediate database which received the search request, transmit the search request to all databases, from which a request origin which sent the search request is excluded, of the primary database, the intermediate database, and the end databases, each being directly connected to the intermediate database which received the search request; and
aggregate results for the search request and return the results to the request origin, with respect to the primary database, the intermediate database, and the end databases which received the search request.

4. The database management system according to claim 1, wherein the at least one processor is further configured to, based on the virtual data table, specify a top-level intermediate database or a top-level end database which involves the common information comprised in the search criterion.

5. The database management system according to claim 1, wherein the primary database or the intermediate database comprises a plurality of the virtual data tables in which attributes of the common information are different,
hierarchical structures of the hierarchical database are different from each other for each attribute, and
the at least one processor is further configured to select a hierarchical structure which involves the attribute contained in the search criterion.

6. The database management system according to claim 1, further comprising a data allocation unit configured to alter a hierarchical structure of the hierarchical database.

7. The data management system according to claim 6, wherein the data allocation unit is further configured to duplicate, in another end database or another intermediate database, the virtual data table and the registered data falling under the virtual data table.

8. The database management system according to claim 7, wherein the registered data duplicated is comprised as the registered data registered in the hierarchical database, which is a target of the searching unit.

9. The database management system according to claim 1, further comprising a virtualization unit configured to group multiple end databases of the plurality of end databases based on geographical information thereof to create a virtualized end database.

10. The database management system according to claim 9, wherein the virtualization unit is further configured to make the hierarchical database redundant by: dividing the multiple end databases comprised in the virtualized end database into two groups, being a first database group and a second database group; and performing reconfiguring such that each of the first database group and the second database group stores all of the registered data comprised in the virtualized end database.

11. A method of managing a hierarchical database, comprising:

storing a plurality of pieces of registered data in an end database of the hierarchical database, the end databases being connected to a primary database directly, or indirectly through at least one intermediate database in the hierarchical database;

generating a virtual data table in at least one of the primary data base or the intermediate database, the virtual data table storing search paths which are grouped by common information relating to the plurality of pieces of the registered data, the search paths leading to the registered data stored in:

a next-lower database which is a lower level-side intermediate database or a lower level-side end database, each being directly connected to the primary database or the intermediate database; or the intermediate database or the end database, each being indirectly connected to the primary database or the intermediate database through the next-lower database;

extracting the intermediate database or the end database which stores the common information included in a search criterion by referring to the virtual data table;

selecting the intermediate database or the end database which includes the common information as a starting point of a search; and searching matching data which matches the search criterion from the registered data which are registered in the hierarchical database.

12. The method according to claim 11, wherein when there are a plurality of the search criteria simultaneously, the intermediate database or the end database which includes the common information is selected such that the starting points are different from each other.

13. The method according to claim 11, further comprising:

sending a search request to the starting point;
with respect to the intermediate database which received the search request, transmitting the search request to all databases, from which a request origin which sent the search request is excluded, of the primary database, the intermediate database, and the end databases, each being directly connected to the intermediate database which received the search request; and
aggregating results for the search request and returning the results to the request origin, with respect to the primary database, the intermediate database, and the end databases which received the search request.

14. The method according to claim 11, further comprising:

based on the virtual data table, specifying a top-level intermediate database or a top-level end database which involves the common information comprised in the search criterion.

15. The method according to claim 11, wherein
the primary database or the intermediate database comprises a plurality of the virtual data tables in which attributes of the common information are different,
hierarchical structures of the hierarchical database are different from each other for each attribute, and
the method further comprises selecting a hierarchical structure which involves the attribute contained in the search criterion.

16. The method according to claim 11, further comprising altering a hierarchical structure of the hierarchical database.

17. The method according to claim 16, further comprising duplicating, in another end database or another intermediate database, the virtual data table and the registered data falling under the virtual data table.

18. The method according to claim 17, wherein the registered data duplicated is comprised as the registered data registered in the hierarchical database, which is a target of searching.

19. The method according to claim 11, further comprising grouping multiple end databases of the plurality of end databases based on geographical information thereof to create a virtualized end database.

20. The method according to claim 19, further comprising making the hierarchical database redundant by: dividing the multiple end databases comprised in the virtualized end database into two groups, being a first database group and a second database group; and performing reconfiguring such that each of the first database group and the second database group stores all of the registered data comprised in the virtualized end database.

* * * * *